United States Patent Office 3,019,653
Patented Feb. 6, 1962

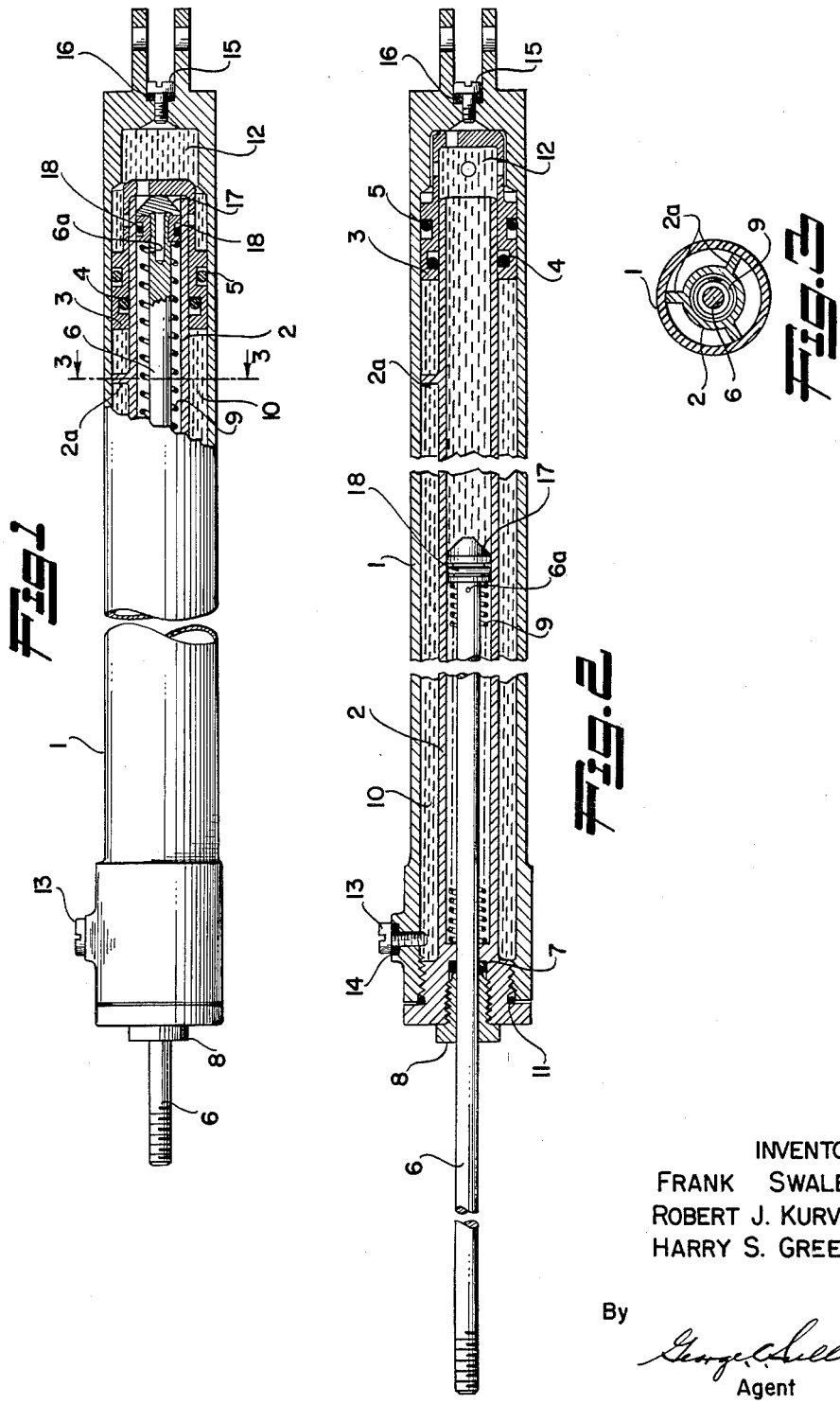

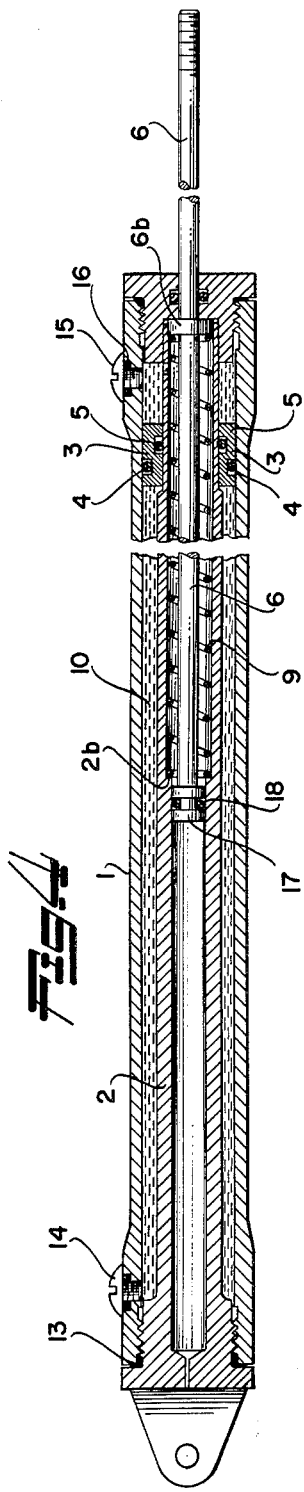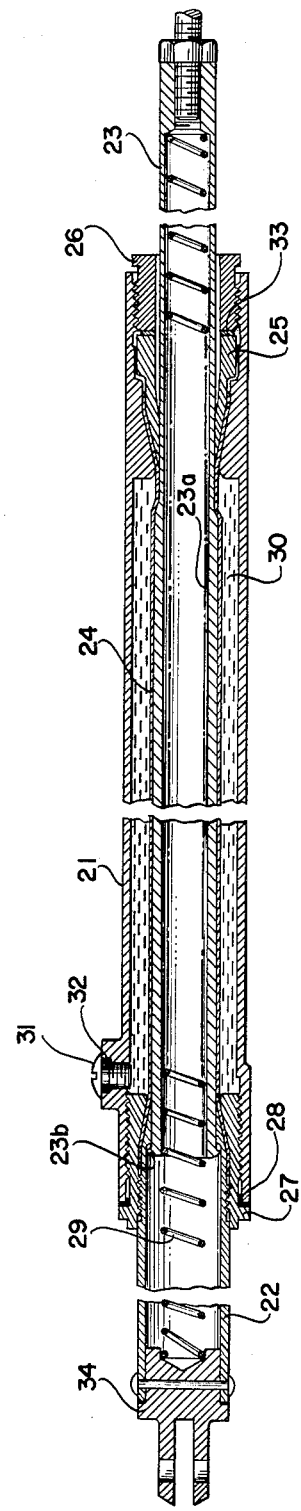

3,019,653
THERMAL ACTUATOR
Frank Swales, Granada Hills, Robert J. Kurvers, North Hollywood, and Harry S. Green, Sepulveda, Calif., assignors to Lockheed Aircraft Corporation, Burbank, Calif.
Filed May 9, 1960, Ser. No. 27,972
3 Claims. (Cl. 73—368.3)

This invention relates to a temperature responsive device and more particularly to a device for transducing ambient heat to mechanical work through the medium of a fluid having a high coefficient of thermal expansion.

There are many instances where it is desired to provide a device which is responsive to a temperature change and which will provide a mechanical force proportional to the change in temperature. Prior devices which utilize an expansible fluid have been restricted in their use, and accordingly, are incapable of general application. For example, the volume of the expansible fluid is usually large, exhibiting a noticeable lag due to heat transfer through the great mass of fluid. Also in many instances the container or device must be maintained in one position, which inherently limits the usefulness of the device. Furthermore, in many cases force of an expansible liquid is transmitted through a large area piston, thereby necessitating expenditure of considerable force to overcome friction.

The present invention has for its primary object the overcoming of the known disadvantages of the conventional devices.

A further object of the invention is to provide a thermally responsive actuator having general utility.

A further object of the invention is to provide a transducer for converting changes in ambient temperature to a mechanical force.

Another object of the invention is to provide a transducer which is highly sensitive to ambient changes in temperature and which supplies a force and displacement to perform mechanical work.

These and other objects will become apparent to those skilled in the art by reference to the description and drawings in which:

FIGURE 1 is a lateral view partly in cross-section of a preferred embodiment of the invention with the parts shown in a low temperature or original setting position.

FIGURE 2 is a cross sectional view of the embodiment of FIGURE 1, with the various elements displaced after a rise in temperature.

FIGURE 3 is a transverse sectional view taken on the line 3—3 of FIGURE 1.

FIGURE 4 is a lateral view in cross section of a variation of the invention shown in FIGURE 1.

FIGURE 5 is a lateral view in cross section of a second embodiment of the invention.

Referring to FIGURES 1 and 2, outer cylinder 1 is closed at one end thereof, and has a conventional bracket for mounting as shown. Inner cylinder 2 is fitted within the open end of outer cylinder, and maintained in a spacing relation therewith by three small projections 2a (as best seen in FIGURE 3) which are spaced preferably at regular intervals of about 120° around the cylinder. Annular piston 3 fitted with annular sealing rings 4 and 5 is slidably fitted within outer cylinder 1 and outside the inner cylinder 2. Thus it is readily seen that the inner and outer cylinder and the annular piston define an outer annular space which is varied as the piston is displaced.

Push rod 6 is slidable within the inner cylinder and projects through the open end of the inner cylinder. Sealing ring 7 and gland nut 8 provide a sealing arrangement for the rod. Spring 9 which surrounds the rod urges the rod to its retracted position as illustrated in FIGURE 1. As seen in FIGURES 1 and 2, a second or inner space is formed within the inner cylinder by the rod, inner cylinder and the annular piston 3.

The inner space is filled with a low viscosity fluid 12 through the filler port formed by removing screw 15, and the annular piston 3 is moved to the position as shown in FIGURE 1. The outer annular space is filled with an expansion fluid 10 through the filler port by removing screw 13, the latter providing a means of adjusting the initial setting. Sealing rings 14 and 16 prevent leakage of the expansion fluid and low viscosity fluid respectively.

A piston 17 is attached to the inner end of the push rod 6, and provided with a seal 18. Where an impulsive external force is applied to the push rod the resulting energy may be dissipated by passing the low viscosity fluid through an orifice 6a which is drilled in the push rod, allowing fluid to by-pass the push rod seal at a controlled rate.

Assuming a rise in the ambient temperature, the expansion fluid 10 (FIGURE 1) expands in proportion to the change of temperature and the increased pressure forces the annular piston 3 toward the right. The pressure is transmitted uniformly to the low viscosity fluid and into the inner cylinder where it causes the push rod to extend from the cylinder, as shown in FIGURE 2.

In FIGURE 4, wherein like reference characters are used to designate the same elements, the rod has been reversed so that instead of extending for a rise in temperature, it retracts within the inner cylinder.

Inner cylinder 2 is provided with an internal annular shoulder 2b against which one end of spring 9 rests, the other end of the spring bearing against an annular collar 6b on the actuator rod 6. The inner end of rod 6 is provided with a piston 17 and seal 18. As illustrated, the mounting bracket is on the end opposite to that of FIGURE 1 and the rod likewise is shifted to the other end. Thus the piston 17 moves in the same direction as in FIGURE 1, but now pulls the rod instead of pushing as in FIGURE 1.

FIGURE 5 illustrates a simplified embodiment in which the expansion fluid acts directly on the piston rod, thereby eliminating the annular piston and low viscosity fluid. The outer cylinder 21 is provided with an end cylinder 22, which is retained in the end of the cylinder 21 by means of the sleeve 27. A flexible sheath 24 is held in place at one end between the complimentary surfaces of end cylinder 22 and sleeve 27 and at the other end between the complimentary surfaces of the outer cylinder 21 and the collet 25. The collet is held in place by end nut 26.

A stepped piston rod 23, provided by a stepped or increased diameter of the rod as at 23a, is inserted within the end cylinder and through the flexible sheath. A return spring 29 is inserted within the hollow rod and an end cap 34 closes the end cylinder 22. The spring normally urges the piston rod 23 to the extended position, which is limited by the annular bead 23b on the piston rod.

The space between the outer cylinder 21 and the flexible sheath is filled with expansion fluid 30 through the filler and adjusting screw 31. Seal 28 prevents leakage between outer cylinder 21 and sleeve 27 and the natural deformation of flexible sheath 24 prevents leakage at the other points of assembly. Expansion of the fluid 30 in response to a rise in temperature reacts against the stepped rod and withdraws the rod within the cylinder against the pressure of spring 29.

Thus it is apparent that the present invention provides a device which generates a mechanical force in response to changes in temperature. Large volumes of the temperature expansive fluid are avoided and obviously the device can be operated in any position. In each of the above illustrated embodiments, an increase or rise in temperature causes an increase in the volume of the expansion fluid which is in turn converted to useful mechanical work by means of the piston rod. In response to a fall or decrease in temperature the volume of the fluid decreases and the return spring restores the piston rod to its original position.

While specific embodiments of the invention have been shown and described it should be understood that certain alterations, modifications and substitutions may be made to the instant disclosure without departing from the spirit and scope of the invention as defined by the appended claims.

We claim:

1. A thermal actuator comprising an outer cylinder and an inner cylinder spaced from said outer cylinder and defining an annular space closed at one end, an annular piston on side of which closes off a portion of said annular space, a thermally expansible fluid responsive to variations in the ambient temperature in the vicinity of the outer cylinder filling said space, a piston within and slidably engaging said inner cylinder, a low viscosity fluid cooperating with the other side of said annular piston and filling the remainder of said annular space and a portion of said inner cylinder, said second mentioned piston terminating said portion of the inner cylinder, an actuating rod attached to said inner cylinder piston and a return spring urging said piston and rod against said low viscosity fluid.

2. A thermal actuator comprising an outer hollow cylinder having a closed end and an open end, an inner cylinder having an open end and an internal hollow portion of the same diameter as said open end and extending substantially the length of said inner cylinder, means for sealingly engaging the other end of said inner cylinder with the open end of said outer cylinder, an actuator rod extending through a central aperture in said other end of the inner cylinder, a piston attached to the inner end of said rod and slidably engaging the inner cylinder, said inner and outer cylinders having an annular space therebetween, expansion fluid contained in said space and responsive to ambient temperature variations, means for transferring pressure from said expansion fluid to said piston and rod, whereby said rod is displaced a distance in proportion to said pressure and spring means for returning said piston and rod to the original position in the absence of said pressure.

3. A thermal actuator comprising a source of varying temperature a pair of concentric hollow cylinders, means for spacing said cylinders apart to define an annular space therebetween, an actuating piston slidable within the inner cylinder, an actuating rod attached to said piston, expansion fluid responsive to said temperature and filling said annular space and means including an annular piston and a low viscosity fluid for transferring variations in said fluid to said actuating piston.

References Cited in the file of this patent

UNITED STATES PATENTS

| | | |
|---|---|---|
| 2,578,992 | Dickey | Dec. 18, 1951 |
| 2,928,233 | Kimm | Mar. 15, 1960 |
| 2,941,379 | Nelson | June 21, 1960 |

FOREIGN PATENTS

| | | |
|---|---|---|
| 1,016,502 | Germany | Sept. 26, 1957 |
| 526,340 | Italy | May 16, 1955 |